Figure 1:
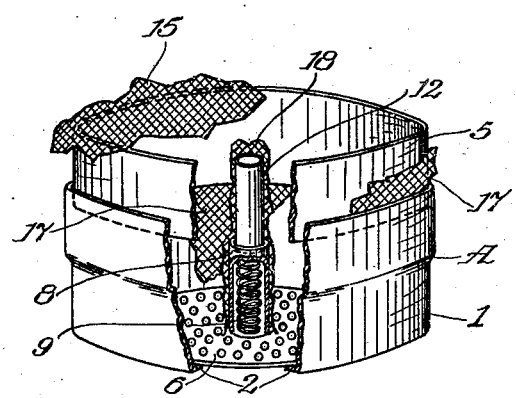

C. S. BROWN & A. S. BRINCKERHOFF.
CHEESE HOOP.
APPLICATION FILED SEPT. 28, 1908.

929,384.

Patented July 27, 1909.

WITNESSES:
E. T. De Giorgi
Lewis Bennett

INVENTORS
Charles S. Brown
Albert S. Brinckerhoff
BY
Risley Love
ATTORNEYS

UNITED STATES PATENT OFFICE.

CHARLES S. BROWN AND ALBERT S. BRINCKERHOFF, OF UTICA, NEW YORK.

CHEESE-HOOP.

No. 929,384.  Specification of Letters Patent.  Patented July 27, 1909.

Application filed September 28, 1908. Serial No. 454,970.

*To all whom it may concern:*

Be it known that we, CHARLES S. BROWN and ALBERT S. BRINCKERHOFF, citizens of the United States, residing at Utica, in the county of Oneida and State of New York, have invented certain new and useful Improvements in Cheese-Presses, of which the following is a specification, reference being had therein to the accompanying drawing.

Our invention relates to an improved cheese-hoop, and we declare the following is a full, clear, concise and exact description thereof, sufficient to enable one skilled in the art to make and use the same, reference being had to the accompanying drawings in which like reference characters refer to like parts throughout.

While we specify the invention as appertaining to an improved cheese-hoop, it applies to that mechanism or device which is used in the compressing of the curd into the form of cheese, and which device goes by the general term of a cheese hoop as distinguished from a cheese press wherein several of these devices are assembled and pressure applied to them.

We illustrate herein a single form of what is called a cheese-hoop, but it will be understood that our improvement is applicable to any device used for massing the cheese curd in the commercial article.

The purpose of the device is to press or form the cheese by the use of any mechanical and suitable means and in any appropriate manner, but forming it with a central vertical hole. By making the cheese with such a hole or aperture the waste is avoided that occurs in the cutting of a solid cheese in the ordinary manner from the circumference to the center, by reason of the crumbling away of the apex of the pieces thus cut. The same manner of cutting a cheese which has the central bore produces pieces which have blunt points, so to speak. The saving of material in the latter instance is a volume equal to the size of the bore.

Figure 3:
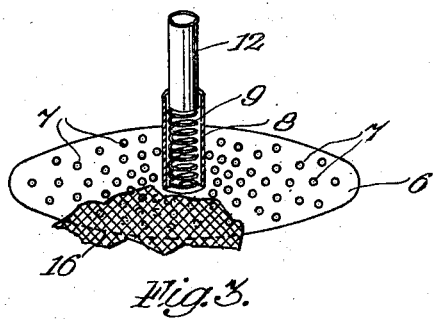
Figure 2:
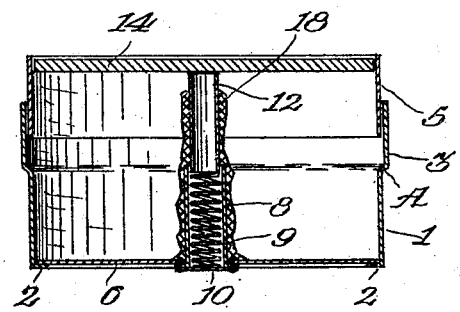

Figure 1 of the drawings is a perspective view of the device, portions of the side of several members being broken away. Fig. 2 is a central sectional view. Fig. 3 is a perspective view of a part.

Referring to the drawings in detail 1 is a vessel, in this instance circular and metallic, of proper size and thickness, and which may ordinarily be termed a hoop or band. Its lower edge is flared or turned inwardly, as seen at 2, to form a support for the removable bottom of the vessel. The band or vessel is made with its lower part perhaps a half of its vertical measurement of a given diameter, the other or upper half being of a slightly larger diameter, leaving a flare between the upper and lower edges, the upper part, that of the larger diameter being designated by 3.

At 5 is shown a band adapted to fit into the enlarged upper portion 3 of the hoop 1. This band or hoop, like the hoop above described, is of suitable material and thickness for the purpose. It consists of a hoop having its ends secured by some ordinary catch to hold them together whereby the band may be slipped down in the upper portion of the hoop or vessel A.

The bottom of the device, 6, is a sheet of metal or other suitable material, with small perforations 7 to allow the escape of the liquid, and is supported within the vessel on the flange 2, being removable, however, therefrom. On this disk or plate 6 is mounted a tubular member 8 having within it a coil spring 9 supported on a bottom piece 10 made integral with the bottom 6 or secured on the tubular member 8. Within the tubular member 8 is a plug 12 which may be either solid or tubular, and which is adapted at its inner end to bear against the spring 9 and slide freely in and out of the tubular member 8.

14 represents a plate or cover which is placed on top of the curd in the hoop or press and to which pressure is applied by any suitable means to press the contents of the hoop. This board or cover is intended to bear against the end of the plug 12 so that the pressure applied to the board will crowd the plug 12 into the tube 8 such distance as may be necessary in thoroughly compressing the contents of the vessel and maintaining the central bore or aperture.

15 represents a cover or cloth which is placed over the curd within the hoop 2 or to be pressed therein when the board or presser 14 is in place.

16 is a cloth of suitable texture laid over the inner surface of the perforated bottom 6 which prevents the exudation of the material to be pressed, but allows the pressing of the liquid therethrough. A cloth or cover or bandage 17 is also placed within the vessel 1 over its top and between the vessel and the hoop 5.

At 18 is shown a cloth of tubular form placed over the inner telescoping members wherewith to form the rind on the central bore or aperture. It will be understood that any suitable material other than cloth may be used.

In practice the bottom 6 with the collapsible tube thereon is placed in the vessel 1 and the cloth 16 is laid on the surface of the bottom, and the cloth or bandage 17 is then put in place around the inside of the hoop, and the ring or hoop 5 is then put in place, as seen in Fig. 1. Curd is then filled into the vessel to proper height, when the cover cloth 15 is laid on top and the board or cover 14, by which pressure is applied, is placed within the hoop 5. The contents are pressed for a suitable time, after which the cover 14 is removed and the band 5 taken out, the cloth 17 being then brought directly against the side surface of the upper portion of the mass thus formed. The board or cover 14 is then replaced and further pressure applied, the board pressing the tubular member or plug 12 into its socket as the compression reduces the volume of the contents.

In practice several of these devices are arranged in series, the bottom of one fitting into the enlarged upper portion of the other, the vessel having different top and bottom diameters for this purpose and also to prevent the band or hoop 5 slipping to the bottom of the vessel and becoming inaccessible for removal after the initial pressure has been applied.

We have shown the device in a single embodiment, but it will be understood that it is applicable to a variety of uses and conditions.

Having described our invention, what we claim as new and desire to secure by Letters Patent, is:

1. A cheese hoop comprising telescoping outer walls and inner telescoping members whereby to allow compression of a quantity of material into an interiorly apertured mass, substantially as described.

2. A cheese hoop with its outer wall comprising two portions of different diameters, a collar slidably mounted within the portion of greater diameter, and a removable perforated bottom with telescoping members mounted thereon, and a spring in said telescoping members whereby they are normally kept in extended position in combination, substantially as described.

3. A cheese hoop having a bottom with telescoping members vertically mounted thereon, and a spring mounted in one and bearing against the other normally extending them, whereby to maintain a central space in the product formed within the hoop, substantially as described.

4. In a cheese-hoop, interiorly mounted telescoping members located to form an interior bore in the cheese, substantially as described.

5. In a cheese-hoop, interiorly mounted telescoping members located to form an interior bore in the cheese, and a rind-forming material surrounding the said members, whereby to form an inner bore in the cheese, substantially as described.

6. In a cheese-hoop, the combination with telescoping outer and interior members adapted to form an outer surface and an interior bore in the cheese, of means associated with said members whereby to form a rind on the outer and the inner surfaces of the cheese, substantially as described.

7. In a cheese hoop, the combination with telescoping and interior members adapted to form an outer surface and an interior bore in the cheese, of a follower of the area of the inside area of the outer telescoping member and pressing against the end of the inner telescoping members whereby to compress the material and to reduce the inner telescoping members to the height of the finished product, substantially as described.

In testimony whereof we affix our signatures in presence of two witnesses.

CHARLES S. BROWN.
ALBERT S. BRINCKERHOFF.

Witnesses:
E. T. DE GIORGI,
HENRY M. LOVE.